United States Patent
Yang et al.

(10) Patent No.: US 12,234,122 B2
(45) Date of Patent: Feb. 25, 2025

(54) AUTHORIZATION MANAGEMENT AND AUTHORIZATION REQUEST OF ELEVATOR SERVICE REQUEST

(71) Applicant: Otis Elevator Company, Farmington, CT (US)

(72) Inventors: Yang Yang, Shanghai (CN); Yu Zhang, Shanghai (CN); Kai Li, Shanghai (CN); Siqi Ma, Shanghai (CN); Haofeng Hou, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1757 days.

(21) Appl. No.: 16/293,885

(22) Filed: Mar. 6, 2019

(65) Prior Publication Data

US 2019/0276274 A1 Sep. 12, 2019

(30) Foreign Application Priority Data

Mar. 6, 2018 (CN) .......................... 201810182831.3

(51) Int. Cl.
*B66B 1/34* (2006.01)
*B66B 1/46* (2006.01)
(Continued)

(52) U.S. Cl.
CPC ............ *B66B 1/468* (2013.01); *B66B 1/3461* (2013.01); *G06Q 50/163* (2013.01);
(Continued)

(58) Field of Classification Search
CPC ... B66B 1/3407; B66B 1/3415; B66B 1/3446; B66B 1/3461; B66B 5/0006; B66B 5/0012; B66B 2201/4676
See application file for complete search history.

(56) References Cited

U.S. PATENT DOCUMENTS 8,047,333 B2 * 11/2011 Finschi ................... B66B 1/468
187/382
8,935,777 B2 1/2015 Desoto et al.
(Continued)

FOREIGN PATENT DOCUMENTS

CN 203025807 U 6/2013
CN 107393078 A 11/2017
(Continued)

OTHER PUBLICATIONS

European Search Report for application EP 19161157.3, Jul. 23, 2019, U321153EP, 8 pages.
(Continued)

*Primary Examiner* — Christopher Uhlir
(74) *Attorney, Agent, or Firm* — CANTOR COLBURN LLP

(57) ABSTRACT

Authorization management and authorization requesting for an elevator service request, and belongs to the field of elevator management technologies. An authorization management apparatus for an elevator service request according to the present invention comprises: a receiving unit configured to receive authorization request information from one or more personal mobile terminals, wherein the authorization request information comprises an elevator identifier of a corresponding elevator of an elevator system acquired by a corresponding personal mobile terminal and a terminal identifier of the personal mobile terminal mapped to the elevator identifier; and an authorization management unit configured to determine, at least according to a mapping relationship between the elevator identifier and the terminal identifier in the authorization request information, whether the authorization request information from the corresponding personal mobile terminal is allowed to be authorized.

26 Claims, 3 Drawing Sheets

(51) Int. Cl.
*G06Q 50/163* (2024.01)
*H04B 1/3827* (2015.01)

(52) U.S. Cl.
CPC ............... *B66B 2201/4615* (2013.01); *B66B 2201/4653* (2013.01); *B66B 2201/4676* (2013.01); *H04B 1/3827* (2013.01)

(56) References Cited

U.S. PATENT DOCUMENTS

| | | |
|---|---|---|
| 9,437,061 B2 | 9/2016 | Mehl et al. |
| 9,557,719 B2 | 1/2017 | Liu et al. |
| 9,580,272 B2 | 2/2017 | Kappeler et al. |
| 9,589,398 B2 | 3/2017 | Kappeler et al. |
| 9,785,876 B2 | 10/2017 | Troesch |
| 9,819,509 B2 | 11/2017 | Nugent et al. |
| 10,167,170 B2* | 1/2019 | Kim ................... B66B 1/2408 |
| 2012/0068818 A1 | 3/2012 | Mizon |
| 2015/0045956 A1* | 2/2015 | Joyce ................... B66B 1/3446 700/275 |
| 2015/0194000 A1* | 7/2015 | Schoenfelder ..... G07C 9/00309 340/5.61 |
| 2015/0204678 A1 | 7/2015 | Schuster |
| 2016/0009525 A1* | 1/2016 | DePaola ................ B66B 1/468 340/5.61 |
| 2016/0207735 A1* | 7/2016 | Elomaa ................ B66B 1/2458 |
| 2016/0239694 A1 | 8/2016 | Chin et al. |
| 2016/0244295 A1* | 8/2016 | Salmikuukka ........ B66B 1/2458 |
| 2016/0311647 A1 | 10/2016 | Peterson et al. |
| 2016/0364927 A1* | 12/2016 | Barry .................... G08B 25/10 |
| 2016/0376124 A1 | 12/2016 | Bünter et al. |
| 2017/0142581 A1 | 5/2017 | Tarmey et al. |
| 2017/0203938 A1 | 7/2017 | Sudo et al. |
| 2017/0270725 A1 | 9/2017 | Troesch et al. |
| 2017/0270728 A1 | 9/2017 | Troesch et al. |
| 2017/0316627 A1 | 11/2017 | König |
| 2019/0276275 A1* | 9/2019 | Yang .................... B66B 5/0087 |
| 2021/0107766 A1* | 4/2021 | Thum ................... B66B 5/0018 |

FOREIGN PATENT DOCUMENTS

| | | |
|---|---|---|
| WO | 2015121294 A1 | 8/2015 |
| WO | 2007014477 A2 | 12/2016 |
| WO | 2016198548 A1 | 12/2016 |
| WO | 2017175020 A1 | 10/2017 |
| WO | 20170220678 A1 | 12/2017 |

OTHER PUBLICATIONS

European Opposition to Application No. 19161157.3, Issued Mar. 22, 2023, 49 Pages.

* cited by examiner

AUTHORIZATION MANAGEMENT AND AUTHORIZATION REQUEST OF ELEVATOR SERVICE REQUEST

FOREIGN PRIORITY

This application claims priority to Chinese Patent Application No. 201810182831.3, filed Mar. 6, 2018, and all the benefits accruing therefrom under 35 U.S.C. § 119, the contents of which in its entirety are herein incorporated by reference.

TECHNICAL FIELD

The present invention belongs to the field of elevator management technologies, and relates to authorization management and authorization requesting for an elevator service request, and in particular, to an authorization management apparatus and method for an elevator service request, a personal mobile terminal and an authorization requesting method for an elevator service request thereof, and an elevator management system using the authorization management apparatus.

BACKGROUND

With the development of elevator technologies, various technologies for implementing an elevator service request operation automatically by a personal mobile terminal such as a smart phone have emerged. However, not every passenger has the right to send an elevator service request command to an elevator system through a personal mobile terminal for facilitating the elevator management. Generally, only an authorized personal mobile terminal is allowed to send an elevator service request command to an elevator system.

Currently, access permissions of an elevator system or a specific elevator are granted to passengers one by one by a manager face to face. An access certificate, such as a PVC card, having the access permission of a corresponding elevator is issued to an authorized passenger.

SUMMARY OF THE INVENTION

According to a first aspect of the present invention, a personal mobile terminal is provided, comprising: an acquiring unit configured to acquire an elevator identifier of a corresponding elevator of an elevator system; and an authorization request generating and sending unit configured to generate authorization request information and send the authorization request information, wherein the authorization request information includes the acquired elevator identifier and a terminal identifier of the personal mobile terminal mapped to the elevator identifier.

The personal mobile terminal according to an embodiment of the present invention is further configured to be able to automatically send an elevator service request command to the corresponding elevator of the elevator system if the authorization request information is allowed to be authorized.

In the personal mobile terminal according to an embodiment of the present invention, the authorization request information further includes identity certificate information of a passenger and/or a floor requested to be authorized.

The personal mobile terminal according to an embodiment of the present invention further includes: an input unit configured to input at least the floor requested to be authorized.

In the personal mobile terminal according to an embodiment of the present invention, the acquiring unit is an image acquiring device.

In the personal mobile terminal according to an embodiment of the present invention, the elevator identifier is a QR code or a barcode, and the acquiring unit is configured to acquire the elevator identifier by scanning the QR code or the barcode.

In the personal mobile terminal according to an embodiment of the present invention, the terminal identifier is a communication number, a unique identification code of the personal mobile terminal, or an ID of a passenger using the personal mobile terminal.

In the personal mobile terminal according to an embodiment of the present invention, the authorization request generating and sending unit is further configured to send the authorization request information to an authorization management apparatus for an elevator service request corresponding to the elevator system.

In the personal mobile terminal according to an embodiment of the present invention, the authorization request generating and sending unit is further configured to establish a mapping relationship between the acquired elevator identifier and the terminal identifier of the personal mobile terminal such that the terminal identifier is mapped to the elevator identifier.

According to a second aspect of the present invention, an authorization requesting method for an elevator service request is provided, comprising steps of: acquiring an elevator identifier of a corresponding elevator of an elevator system; and generating authorization request information and sending the authorization request information, wherein the authorization request information includes the acquired elevator identifier and a terminal identifier of a personal mobile terminal mapped to the elevator identifier.

In the authorization requesting method according to an embodiment of the present invention, the authorization request information further includes identity certificate information of a user.

In the authorization requesting method according to an embodiment of the present invention, the elevator identifier is a QR code or a barcode.

In the authorization requesting method according to an embodiment of the present invention, in the acquisition step, the elevator identifier is acquired by scanning the QR code or the barcode.

In the authorization requesting method according to an embodiment of the present invention, the terminal identifier is a communication number, a unique identification code of the personal mobile terminal, or an ID of a passenger using the personal mobile terminal.

In the authorization requesting method according to an embodiment of the present invention, in the step of sending the authorization request information, the authorization request information is sent to an authorization management apparatus for an elevator service request corresponding to the elevator system.

The authorization requesting method according to an embodiment of the present invention further comprises a step of: establishing a mapping relationship between the acquired elevator identifier and the terminal identifier of the personal mobile terminal such that the terminal identifier is mapped to the elevator identifier or the elevator identifier is mapped to the terminal identifier.

According to a third aspect of the present invention, an authorization request system for an elevator service request is provided, comprising a memory, a processor, and a computer program stored in the memory and operable in the processor, wherein when the program is executed by the processor, the steps in the authorization requesting method according to any of the foregoing aspects are implemented.

According to a fourth aspect of the present invention, a computer readable storage medium having stored thereon a computer program is provided, wherein the program is executed by a processor to implement the steps in the authorization requesting method according to any of the foregoing aspects.

According to a fifth aspect of the present invention, an authorization management apparatus for an elevator service request is provided, comprising: a receiving unit configured to receive authorization request information from one or more personal mobile terminals, wherein the authorization request information includes an elevator identifier of a corresponding elevator of an elevator system acquired by a corresponding personal mobile terminal and a terminal identifier of the personal mobile terminal mapped to the elevator identifier; and an authorization management unit configured to determine, at least according to a mapping relationship between the elevator identifier and the terminal identifier in the authorization request information, whether the authorization request information from the corresponding personal mobile terminal is allowed to be authorized.

The authorization management apparatus according to an embodiment of the present invention, the authorization management apparatus is provided in a property management system of a building where the elevator system is located.

In the authorization management apparatus according to an embodiment of the present invention, the authorization management unit is further configured to display multiple pieces of the authorization request information corresponding to the same elevator system or the same elevator in a list.

In the authorization management apparatus according to an embodiment of the present invention, the authorization management unit is further configured to, if the authorization request information of the personal mobile terminal corresponding to an elevator in an elevator group is allowed to be authorized, allow authorizing the personal mobile terminal to send an elevator service request command to another elevator in the elevator group.

In the authorization management apparatus according to an embodiment of the present invention, the authorization management unit is further configured to determine, in at least one of the following three authorization modes, whether the authorization request information from the personal mobile terminal is allowed to be authorized: (a) fully auto-allowed authorization or fully auto-disallowed authorization, (b) auto-allowed authorization or auto-disallowed authorization by batch, and (c) allowed authorization or disallowed authorization fully based on manual input.

In the authorization management apparatus according to an embodiment of the present invention, the authorization management unit is further configured to use corresponding authorization modes in the authorization modes (a) to (c) for different elevators, different elevator systems, or different elevator groups.

In the authorization management apparatus according to an embodiment of the present invention, the authorization management unit is further configured to, when the authorization mode (b) is used, acquire a first terminal identifier list of personal mobile terminals for auto-allowing authorization by batch and/or a second terminal identifier list of personal mobile terminals for auto-disallowing authorization by batch.

According to sixth aspect of the present invention, an authorization management method for an elevator service request is provided, comprising steps of: receiving authorization request information from one or more personal mobile terminals, wherein the authorization request information includes an elevator identifier of a corresponding elevator of an elevator system acquired by a corresponding personal mobile terminal and a terminal identifier of the personal mobile terminal mapped to the elevator identifier; and determining, at least according to a mapping relationship between the elevator identifier and the terminal identifier in the authorization request information, whether the authorization request information from the corresponding personal mobile terminal is allowed to be authorized.

The authorization management method according to an embodiment of the present invention further comprises a step of: displaying multiple pieces of the authorization request information corresponding to the same elevator system or the same elevator in a list.

The authorization management method according to an embodiment of the present invention further comprises a step of: if the authorization request information of the personal mobile terminal corresponding to an elevator in an elevator group is allowed to be authorized, allowing authorization of the personal mobile terminal to send an elevator service request command to another elevator in the elevator group.

In the authorization management method according to an embodiment of the present invention, in the determination step, at least one of the following three authorization modes is used to determine whether the authorization request information from the personal mobile terminal is allowed to be authorized: (a) fully auto-allowed authorization or fully auto-disallowed authorization, (b) auto-allowed authorization or auto-disallowed authorization by batch, and (c) allowed authorization or disallowed authorization fully based on manual input.

In the authorization management method according to an embodiment of the present invention, in the determination step, corresponding authorization modes in the authorization modes (a) to (c) are used for different elevators, different elevator systems, or different elevator groups.

In the authorization management method according to an embodiment of the present invention, in the determination step, when the authorization mode (b) is used, a first terminal identifier list of personal mobile terminals for auto-allowing authorization by batch and/or a second terminal identifier list of personal mobile terminals for auto-disallowing authorization by batch is acquired.

According to a seventh aspect of the present invention, a computer apparatus is provided, including a memory, a processor, and a computer program stored in the memory and operable in the processor, wherein when the program is executed by the processor, the steps in the authorization management method according to any of the foregoing aspects are implemented.

According to an eighth aspect of the present invention, a computer readable storage medium having stored thereon a computer program is provided, wherein the program is executed by a processor to implement the steps in the authorization management method according to any of the foregoing aspects.

According to a ninth aspect of the present invention, an elevator management system is provided, wherein the elevator management system for managing a personal mobile terminal configured to send an elevator service request command automatically includes the authorization management apparatus according to any of the foregoing aspects.

The foregoing features and operations of the present invention will become more obvious according to the following description and the accompanying drawings.

BRIEF DESCRIPTION OF THE DRAWINGS

The above and other objectives and advantages of the present invention will be clearer and more complete through the following detailed description with reference to the accompanying drawings, wherein identical or similar elements are marked with identical reference numerals.

DETAILED DESCRIPTION

The present invention will be described more thoroughly with reference to the accompanying drawings, in which exemplary embodiments of the present invention are shown. However, the present invention can be implemented in many different forms, and should not be construed as being limited by the embodiments described here. On the contrary, these embodiments are provided such that the present disclosure becomes thorough and complete, and concepts of the present invention are fully conveyed to those skilled in the art.

Some block diagrams shown in the accompanying drawings are functional entities, and they are not necessarily corresponding to physically or logically independent entities. These functional entities can be implemented in a software form, or in one or more hardware modules or integrated circuits, or in different processing apparatuses and/or micro-controller apparatuses.

It is noted by the applicant that authorization for an elevator service request needs to be improved because the existing authorization process described in the background is complex and inflexible, the manager cannot manage an elevator system conveniently, cannot perform operations conveniently, and the workload is large, and passengers also have poor experience.

Figure 1:
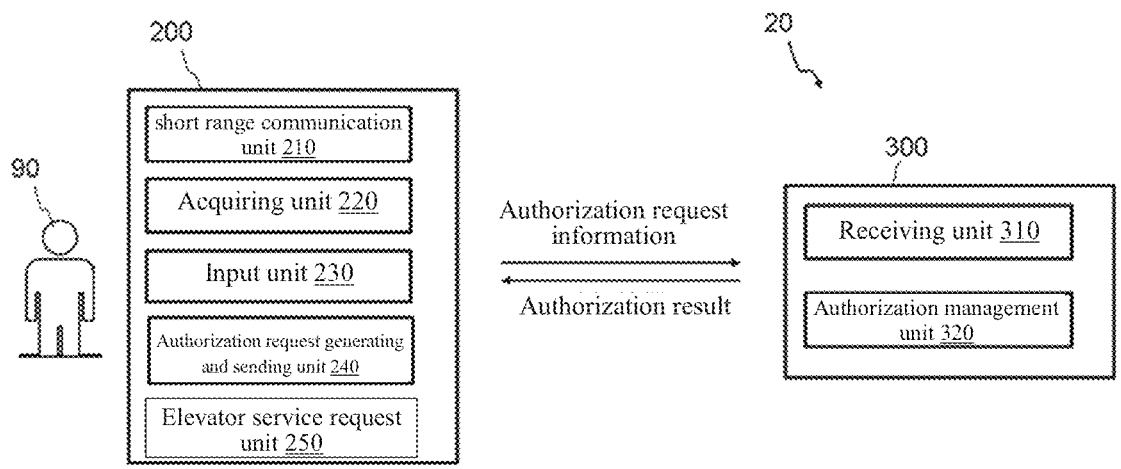
FIG. 1 is a schematic diagram of an elevator management system according to an embodiment of the present invention, wherein an authorization management apparatus for an elevator service request according to an embodiment of the present invention is used.
Figure 2:
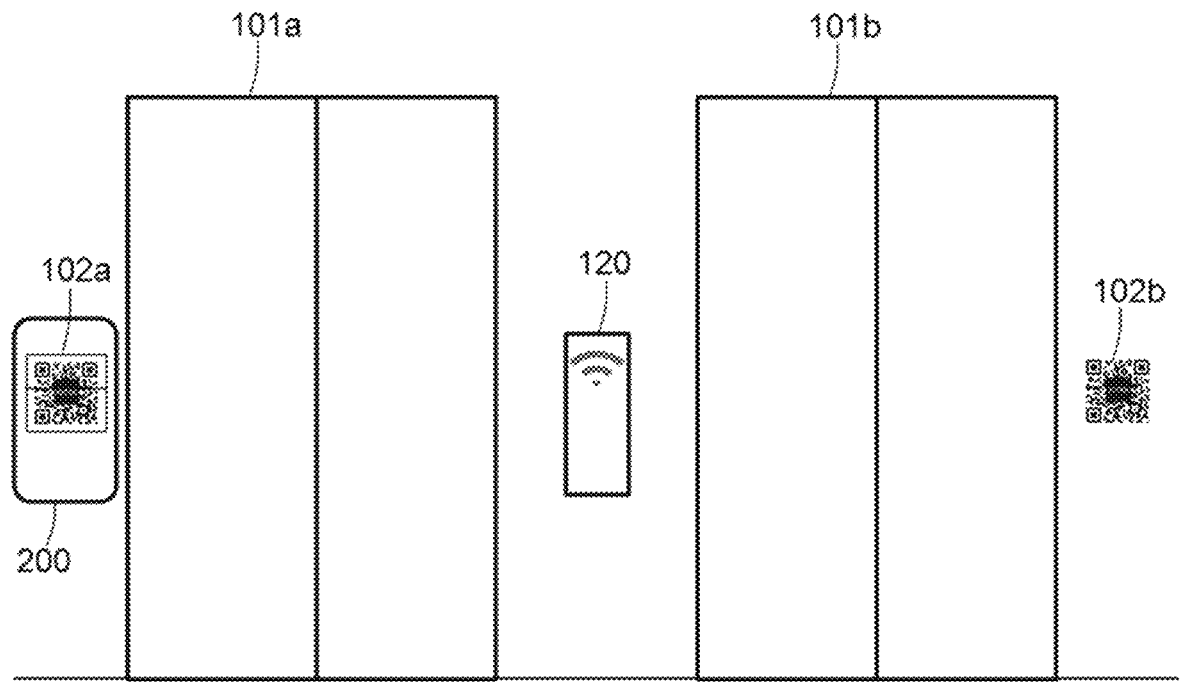
FIG. 2 is a schematic diagram of an application scenario of a personal mobile terminal according to an embodiment of the present invention.
Figure 3:
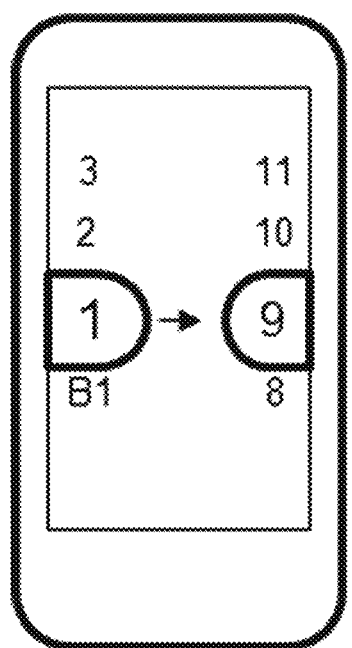
FIG. 3 is a schematic diagram of an input interface of a personal mobile terminal according to an embodiment of the present invention.

FIG. 1 is a schematic diagram of an elevator management system according to an embodiment of the present invention, wherein an authorization management apparatus for an elevator service request according to an embodiment of the present invention is used. FIG. 2 is a schematic diagram of an application scenario of a personal mobile terminal according to an embodiment of the present invention. FIG. 3 is a schematic diagram of an input interface of a personal mobile terminal according to an embodiment of the present invention. An elevator management system 20, a personal mobile terminal 200, and an authorization management apparatus 300 are described in detail through examples in the following with reference to FIG. 1, FIG. 2, and FIG. 3.

The elevator management system 20 in the embodiment of the present invention can manage elevator systems installed or run in multiple buildings (for example, in a residential estate), for example, manage a permission of a passenger 90 accessing a corresponding elevator system. It should be understood that in this application, elevators of the elevator systems can be distinguished or identified by corresponding elevator identifiers. For example, an elevator 101a and an elevator 101b shown in FIG. 2 are elevator No. A and elevator No. B of building No. 10 of the residential estate, and can be allocated with corresponding elevator identifiers 102a and 102b by the manager. The elevator identifier 102 allocated to each elevator can be uniformly stored, for example, in the authorization management apparatus 300 of the elevator management system 20.

As shown in FIG. 2, the elevator identifier 102 allocated to the elevator 101 may be a QR code that can be scanned conveniently, or another identifier that can be acquired conveniently, such as a barcode. The elevator identifier 102 corresponding to an elevator 101 may be installed beside the elevator 101 to facilitate scanning. It will be appreciated that the installation position of the elevator identifier 102 is not limited. In other embodiments, for example, the elevator identifier 102 may also be presented on a network.

It will be appreciated that elevators of an elevator system may be divided into groups or elevators of multiple elevator systems in different buildings may be divided into groups according to management requirements. For example, elevators with the same passenger access permission management may be divided into one group. Correspondingly, the elevator identifier 102 may include group information, so that an elevator group to which the elevator 101 belongs can be learned according to the elevator identifier 102.

It should be noted that one elevator 101 mainly refers to (e.g., one or more) elevator car(s) moving in the same hoistway section of a building.

The personal mobile terminal 200 may be various intelligent terminals with a wireless communication function (such as a Bluetooth communication function), and can be carried by the passenger 90 conveniently. The personal mobile terminal 200 may be provided with a memory, a processor with a computing function, and the like. Specifically, the personal mobile terminal 200 may be a smart phone, a wearable smart device (such as a smart band), a personal digital assistant (PAD), and the like. A corresponding application program or component (such as an APP) may be installed on the personal mobile terminal 200 to implement the elevator service request system in the embodiment of the present invention or the function thereof.

Figure 4:
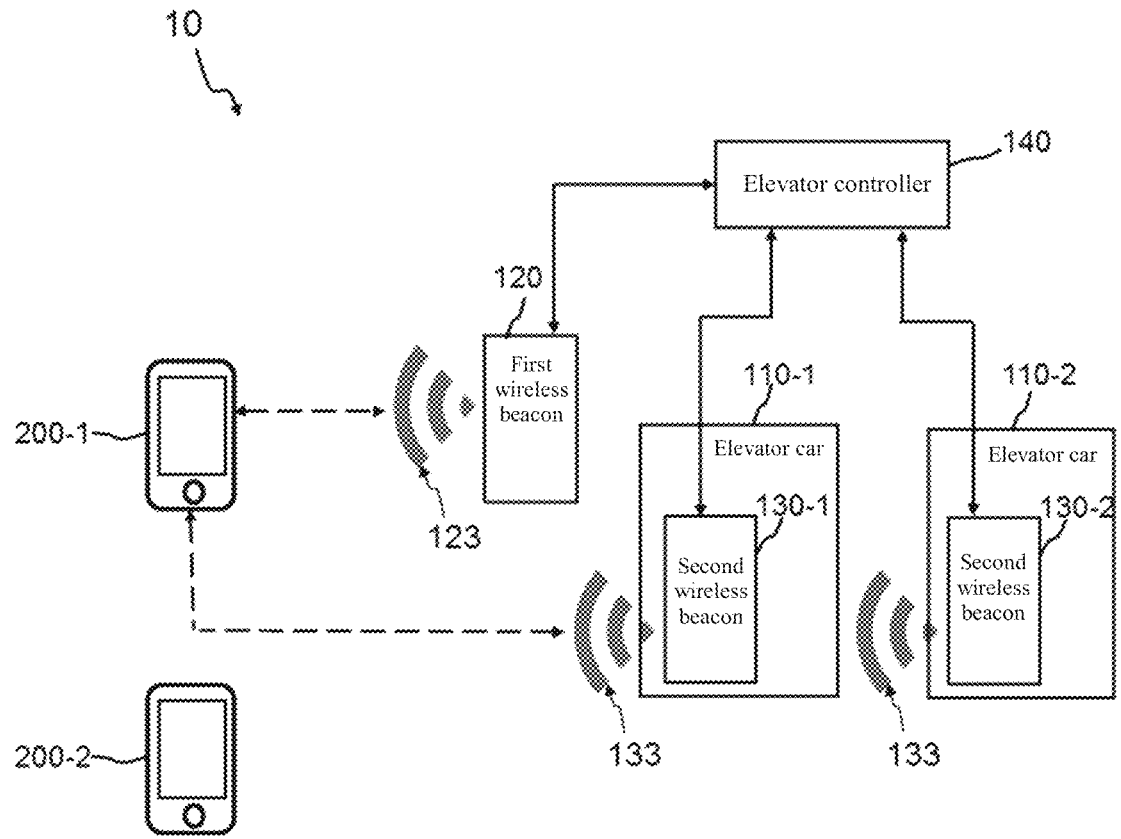
FIG. 4 is a schematic diagram of an elevator system in which a personal mobile terminal according to an embodiment of the present invention is applied.

As shown in FIG. 1, the personal mobile terminal 200 is provided with a short range communication unit 210. Through the short range communication unit 210 provided therein, the personal mobile terminal 200 is capable of automatically sensing a wireless signal (such as a first wireless signal 123) broadcast by a wireless beacon (for example, a first wireless beacon 120 installed in an elevator landing region shown in FIG. 2) installed in the elevator system 10 (as shown in FIG. 4). Moreover, the short range communication unit 210 can establish corresponding wireless communication (such as a Bluetooth connection) with the first wireless beacon 120 when a predetermined condition is met, thus interacting with the wireless beacon in the elevator system, for example, sending an elevator service request command (e.g., an elevator service request command representing an elevator call).

In an embodiment, the personal mobile terminal 200 is provided with an elevator service request unit 250. The elevator service request unit 250 is configured to automatically send a corresponding elevator service request command to the wireless beacon in the elevator system 10 when a predetermined condition is met (for example, when a signal strength value is greater than or equal to a corresponding threshold), so that the passenger 90 can complete, for example, an elevator call request in an operation-free manner.

The elevator service request command generated by the elevator service request unit 250 may include a starting floor, or may include a starting floor and/or a destination floor. The elevator service request command generated by the elevator service request unit 250 may be sent, through a short range communication unit 210, to a wireless beacon (such as the first wireless beacon 120) that has established wireless communication with the short range communication unit 210.

Based on the short range communication unit 210 and the elevator service request unit 250 in the foregoing example, the passenger 90 can automatically complete an elevator service requesting operation when carrying the personal mobile terminal 200, and the passenger experience is good.

However, for the elevator management system 20 or an elevator manager, a permission of an elevator service request of the personal mobile terminal 200 is probably limited according to a management requirement. In other words, authorization of the elevator service request of the personal mobile terminal 200 needs to be managed. For example, a personal mobile terminal 200 of a passenger 90 living at the 9th floor in building No. 10 of a residential estate is only granted with an elevator service request function corresponding to an elevator of the building No. 10 of the residential estate, or is only granted with an elevator service request function corresponding to the 1st floor and the 9th floor of the building No. 10 of the residential estate.

Further, as shown in FIG. 1, the personal mobile terminal 200 in the embodiment of the present invention can generate corresponding authorization request information. To enable the personal mobile terminal 200 to generate corresponding authorization request information conveniently, the personal mobile terminal 200 is provided with an acquiring unit 220. The acquiring unit 220 is configured to acquire an elevator identifier 102 of a corresponding elevator of the elevator system 10. In an embodiment, as shown in FIG. 2, beside each elevator 101, the elevator identifier 102 corresponding to the elevator 101 can be installed. In a particular elevator landing region, the passenger 90 can conveniently acquire the elevator identifier 102 of the elevator 101 through the personal mobile terminal 200. The acquiring unit 220 specifically may be an image acquiring device, such as a camera. As shown in FIG. 2, the image acquiring device is used to scan a QR code 102a of the elevator 101a on spot, so that the passenger 90 can conveniently acquire the elevator identifier.

Further, as shown in FIG. 1, in an embodiment, the personal mobile terminal 200 is further provided with an input unit 230. The input unit 230 can be configured to input at least information about a floor requested to be authorized. For example, after the scanning acquisition process shown in FIG. 2 is finished, the personal mobile terminal 200 displays an interface as shown in FIG. 3, that is, the input unit 230. For example, by sliding up and down to select a floor, the information about the floor requested to be authorized can be input conveniently. For example, it is assumed that the passenger 90 lives in the 9th floor, when requesting authorization, the passenger 90 inputs floor information, namely, the 1st floor and the 9th floor, as shown in FIG. 2 (that is, floors requested to be authorized are the 1st floor and the 9th floor). It will be appreciated that a specific inputting manner of the input unit 230 is not limited to the foregoing example, and the information about the floor requested to be authorized may include more than 2 floors.

Other information to be input, such as an ID card number used as identity certificate information of the passenger 90, can further be input through the input unit 230.

Further, as shown in FIG. 1, in an embodiment, the personal mobile terminal 200 is further provided with an authorization request generating and sending unit 240. The authorization request generating and sending unit 240 is configured to generate authorization request information and send the authorization request information. The authorization request information includes the acquired elevator identifier 102 and a terminal identifier of the personal mobile terminal 200 mapped to the elevator identifier 102. The terminal identifier of the personal mobile terminal 200 can identify the personal mobile terminal 200, and therefore can identify the passenger 90 using the personal mobile terminal 200. The terminal identifier may be a communication number (for example, a mobile phone number when the personal mobile terminal 200 is a mobile phone); the terminal identifier may also be a unique identification code of the personal mobile terminal 200, or even an ID of the passenger 90 using the personal mobile terminal 200.

In an embodiment, the authorization request generating and sending unit 240 is further configured to establish a mapping relationship between the acquired elevator identifier 102 and the terminal identifier of the personal mobile terminal 200 such that the terminal identifier is mapped to the elevator identifier 102 or the elevator identifier 102 is mapped to the terminal identifier. For example, a mapping relationship is established between the elevator identifier 102a acquired through scanning and the communication number of the personal mobile terminal 200, thereby forming corresponding authorization request information. It will be appreciated that when the terminal identifier is mapped to the elevator identifier 102, it also indicates that the elevator identifier 102 is mapped to the terminal identifier. A mapping relationship is established therebetween to facilitate subsequent authorization management.

In an embodiment, the generated authorization request information may include a floor requested to be authorized, which is input in the input interface as shown in FIG. 3, and may further include identity certificate information (such as an ID card, an employee's card, and the like) of a passenger 90. The identity certificate information may be pre-stored in the personal mobile terminal 200, and definitely may also be acquired through, for example, the input unit 230 and/or the acquiring unit 220 in real time. The identity certificate information helps the manager quickly determine whether to allow authorization based on the authorization request information.

The personal mobile terminal 200 can establish a communication connection with the authorization management apparatus 300 through various types of wireless networks. Therefore, the authorization request generating and sending unit 240 of the personal mobile terminal 200 can send the authorization request information to the authorization management apparatus 300 corresponding to the elevator system 10 in real time.

Further, as shown in FIG. 1, the authorization management apparatus 300 may be implemented by various types of computer devices, and may be provided in a building or provided at other places remotely, and its installation location is not limited. Authorization management for multiple elevator systems may be implemented by one authorization management apparatus 300. In an embodiment, the authorization management apparatus 300 may be provided in a property management system of a building where the elevator system is located, thus facilitating a property manager to realize authorization management for an elevator service request.

The authorization management apparatus 300 may be provided with a receiving unit 310. The receiving unit 310 is configured to receive authorization request information from various personal mobile terminals 200 (for example, authorization request information is transmitted through a communication connection established between the personal mobile terminal 200 and the authorization management apparatus 300), so that the authorization request information is centralized and processed in the authorization management apparatus 300.

The authorization management apparatus 300 is further provided with an authorization management unit 320. The authorization management unit 320 is configured to determine, at least according to a mapping relationship between the elevator identifier 102 and the terminal identifier of the personal mobile terminal 200 in the authorization request information, whether the authorization request information from the corresponding personal mobile terminal 200 is allowed to be authorized.

In an embodiment, as shown in Table 1 below, the authorization management unit 320 is further configured to display multiple pieces of the authorization request information in a list as shown in Table 1, such that the manager grasps the authorization request information conveniently and manually performs authorization operation conveniently.

TABLE 1

| Elevator identifier | Floor requested to be authorized | Terminal identifier | Request time | Authorization operation |
|---|---|---|---|---|
| 10-A | 1 ⇌ 9 | 130XXXXXXXX | 2017 Oct. 31 | ☑☒ |
| 10-B | B1 ⇌ 9 | 131XXXXXXXX | 2017 Oct. 31 | ☑☒ |
| 01-C | 9 ⇌ 1 | 132XXXXXXXX | 2017 Oct. 31 | ☑☒ |
| 20-D | 1 ⇌ 12 | 133XXXXXXXX | 2017 Oct. 30 | ☑☒ |
| 20-A | 7 ⇌ 11 | 134XXXXXXXX | 2017 Oct. 29 | ☑☒ |

As shown in Table 1, "elevator identifier" and "terminal identifier" of the authorization request information are corresponding to or mapped to each other in the same row. The authorization request information further includes "floor requested to be authorized," "request time," and other items, which are all presented in the form of a list. Using the first row as an example, 10-A refers to elevator No. A of building No. 10 of a residential estate, and is another expression form of the QR code 102a of the elevator 101a shown in FIG. 2, which can be read by the manager conveniently; "1 ⇌ 9" represents input floors requested to be authorized as shown in FIG. 3, that is, the 1st floor and the 9th floor; "130XXXXXXXX" is a communication number of the personal mobile terminal 200 scanning the QR code 102a, and represents a terminal identifier; and "2017-10-31" represents a request time.

It should be noted that the arrangement of the authorization request information in the list is not limited to the example shown in Table 1. For example, the authorization request information can be arranged according to a chronological order of the request time. Authorization request information corresponding to the same elevator system or the same elevator may be classified and arranged together; or authorization request information may be classified and arranged according to terminal identifiers or floors requested to be authorized.

Further, as shown in FIG. 1, the authorization management unit 320 may be configured to determine, based on any of the following authorization modes, whether the authorization request information is allowed to be authorized: (a) fully auto-allowed authorization or fully auto-disallowed authorization, (b) auto-allowed authorization or auto-disallowed authorization by batch, and (c) allowed authorization or disallowed authorization fully based on manual input.

In an embodiment, with reference to the content shown in Table 1, when the authorization management unit 320 is configured to determine, based on the authorization mode (c), whether the authorization request information is allowed to be authorized, multiple pieces of the authorization request information are displayed in the form of a list (for example, the form shown in Table 1). An "authorization operation" column is further set in the list. The authorization operation column includes icons (such as "☑" and "☒") that are set corresponding to each piece of authorization request information and can be clicked or activated through manual input. The manager can operate on the "authorization operation" column to determine whether to allow authorization of the authorization request information in the corresponding row. For example, clicking or activating "☑" represents allowing authorization of the authorization request information, and clicking or activating "☒" represents not authorizing the authorization request information, that is, not authorizing the current request of the personal mobile terminal 200. Specifically, if the elevator, the elevator system, or the elevator group needs to limit the access permission of each personal mobile terminal, the authorization management unit 320 can perform authorization management in the authorization mode (c) shown above, thus ensuring the security and reliability of permission management.

In another embodiment, when determining whether the authorization request information is allowed to be authorized based on the authorization mode (a), the authorization management unit 320 may be configured to automatically allow and/or automatically disallow authorization of all the authorization request information. Specifically, if the elevator, the elevator system, or the elevator group does not limit the access permission, the authorization management unit 320 can be configured to use the fully auto-allowed authorization in the authorization mode (a). Alternatively, if the elevator, the elevator system, or the elevator group has a permission limitation of not allowing access in the current time period, the authorization management unit 320 may be configured to use the fully auto-disallowed authorization in the authorization mode (a). As such, the authorization operation efficiency is significantly improved, and the workload of the manager is reduced.

In still another embodiment, when determining whether the authorization request information is allowed to be authorized based on the authorization mode (b), the authorization management unit 320 may be configured to automatically allow authorization/automatically disallow authorization of authorization request information in a corresponding batch. As such, at least partially auto-allowed authorization/auto-disallowed authorization is achieved, which also helps improve the authorization operation efficiency and reduce the work load of the manager while ensuring the security and reliability of the permission management. When the authorization mode (b) is used, a first terminal identifier list of personal mobile terminals 200 for auto-allowing authorization by batch and/or a second terminal identifier list of personal mobile terminals 200 for auto-disallowing authorization by batch may further be acquired. For example, the first terminal identifier list of personal mobile terminals 200 for auto-allowing authorization by batch which is pre-stored in the authorization management apparatus 300 may be acquired from the authorization management apparatus 300 through browsing. Specifically, the first terminal identifier list includes, for example, terminal identifiers (such as communication numbers) of personal mobile terminals 200 that do not have an access permission limitation with respect to an elevator or all elevators. As such, in the authorization management unit 320, all authorization request information corresponding to the terminal identifiers in the first terminal identifier list is allowed to be authorized by batch. A similar exemplary operation can be performed for the second terminal identifier list.

It will be appreciated that remaining authorization request information that is not processed in the authorization mode (b) can be manually processed in the authorization mode (c). In an embodiment, after determining whether the authorization request information is allowed to be authorized based on the authorization mode (a) or the authorization mode (b), if the manager needs to manually verify or update the authorization request information, for which the operation of determining whether authorization is allowed has been performed, the manager can continue to perform, based on the authorization mode (c), an operation of manually updating at least part of the authorization request information determined based on the authorization mode (a) or the authorization mode (b) and determining whether the part of the authorization request information is allowed to the authorized.

It should be noted that the authorization management unit 320 is further configured to use different authorization modes for different elevators, different elevator systems, or different elevator groups. For example, the authorization mode (a) is used for authorization request information corresponding to elevators in a predefined elevator group M; the authorization mode (b) is used for authorization request information corresponding to elevators in a predefined elevator group N; and the authorization mode (c) is used for authorization request information corresponding to elevators in a predefined elevator group F.

Further, as shown in FIG. 1, after the authorization operation is completed in the authorization management apparatus 300, the authorization management apparatus 300 will return an "authorization result" indicating, for example, authorization is allowed or disallowed, to the personal mobile terminal 200. The personal mobile terminal 200 can display the authorization result.

For example, if the authorization request information in the first row of Table 1 which is sent by the personal mobile terminal 200 is allowed to be authorized, the personal mobile terminal 200 will obtain a permission of automatically requesting an elevator service at the 1st floor an the 9th floor of the elevator 101a. For example, the personal mobile terminal 200 can automatically send an elevator service request command representing an elevator call operation.

It will be appreciated that if the authorization request information does not include a floor requested to be authorized, the personal mobile terminal 200 will obtain a permission of requesting an elevator service at each floor of the elevator 101a.

In an embodiment, in the case where the elevators 101 are divided into elevator groups according to the foregoing example, if authorization request information of a personal mobile terminal 200 corresponding to an elevator in an elevator group is allowed to be authorized, the personal mobile terminal 200 can be authorized to send an elevator service request command to another elevator in the elevator group. In other words, an "authorization result" of authorization request information of a personal mobile terminal 200 corresponding to one elevator in an elevator group can be shared by and applied to another elevator in the elevator group. For example, if the personal mobile terminal 200 obtains a permission of automatically requesting an elevator service in the elevator 101a, according to a group relationship between the elevator 101a and the elevator 101b as shown in FIG. 2, the personal mobile terminal 200 can automatically obtain a permission of automatically requesting an elevator service in the elevator 101b.

FIG. 4 is a schematic diagram of an elevator system in which a personal mobile terminal according to an embodiment of the present invention is applied. The personal mobile terminal 200 is further configured to be able to automatically send an elevator service request command to the corresponding elevator of the elevator system 10 if the authorization request information is allowed to be authorized. In other words, the authorized personal mobile terminal 200 can automatically complete an elevator service request in the elevator system 10 in the example shown in FIG. 4.

As shown in FIG. 4, the elevator system 10 may be installed in various buildings, and the elevator system 10 includes multiple elevator cars 110 that move in a hoistway of a building. FIG. 1 shows two elevator cars, that is, elevator cars 110-1 and 110-2. Each elevator car 110 is under control (for example, scheduling control, movement control, and the like) of an elevator controller 140 in the elevator system 10, so as to move in the hoistway or stop at a corresponding landing. Generally, the elevator controller 140 needs to acquire an elevator service request command (for example, an elevator service request command representing an elevator call request, that is, an elevator call request command) from an elevator landing region 410 of each floor to control running of the elevator based on the command, for example, control scheduling of the elevator cars 110. It will be appreciated that a specific control mode or control principle of the elevator controller 140 for one or more elevator cars 110 is not limited, and a specific structure, arrangement mode or the like of the elevator controller 140 is not limited either.

To acquire the elevator call request command from each elevator landing region 410, the elevator system 10 is provided with a first wireless beacon 120. The first wireless beacons 120 may be installed in the elevator landing regions 410 of the elevator system 10 (as shown in FIG. 2). For example, at least one first wireless beacon 120 is installed in the elevator landing region of each floor, so that a first wireless signal 123 transmitted or broadcast by the first wireless beacon 120 can roughly cover at least each elevator landing region effectively, thereby forming a corresponding coverage.

Further, as shown in FIG. 4, in an embodiment, an automatic elevator call system 20 of the elevator system 10 may be further provided with one or more second wireless beacons 130 (for example, second wireless beacons 130-1 and 130-2). Each second wireless beacon 130 is installed in a corresponding elevator car 110. For example, one second wireless beacon 130-1 is provided in the elevator car 110-1, and one second wireless beacon 130-2 is provided in the elevator car 110-2. In an embodiment, the second wireless beacon 130 is installed on a destination floor registration control board in the elevator car 110, and integrated on the destination floor registration control board. The installation mode of the second wireless beacon 130 with respect to the elevator car 110 is not limited to the foregoing examples.

The second wireless beacon 130 may transmit or broadcast a second wireless signal 133, for example, continuously (e.g., at intervals of a relatively short time) broadcast the second wireless signal 133. The signal strength of the second wireless signal 133 is attenuated as the broadcast distance increases. The second wireless signal 133 broadcast by the second wireless beacon 130 can roughly effectively cover the region in the elevator car 110 where the second wireless beacon 130 is installed, thereby forming a corresponding coverage.

It should be noted that the second wireless beacon 130 is coupled to the elevator controller 140. Therefore, during operation of each elevator car 110, the second wireless beacon 130 can acquire desired information, for example, current floor information, travel direction information, and the like of the elevator car 110, from the elevator controller 140 in real time, package the floor information and/or the travel direction information (the travel direction information includes, for example, "travel upward," "travel downward," and "halt") into a Bluetooth data signal and the like, and broadcast the information as a second wireless signal.

In an embodiment, the first wireless beacon 120 and/or the second wireless beacon 130 may be a Bluetooth module, and specifically may be a Bluetooth Low Energy (BLE) module. Correspondingly, the first wireless signal 123 transmitted or broadcast by the first wireless beacon 120 and/or the second wireless signal 133 transmitted or broadcast by the second wireless beacon 130 may be a Bluetooth signal (such as a BLE signal).

In an embodiment, the first wireless signal 123 (such as a BLE signal) may include a wakeup signal for waking up a personal mobile terminal 200. A personal mobile terminal 200 sensing the wakeup signal can wake up a corresponding application component (such as an automatic elevator call APP) of the personal mobile terminal 200 to work. Specifically, the first wireless signal 123 may further include a universally unique identifier (UUID) reflecting the identity of the first wireless beacon 120, and/or a data signal about floor location information of the first wireless beacon 120. The second wireless signal 133 may further include a UUID reflecting the identity of the second wireless beacon 130, and/or a data signal about current floor location information of the second wireless beacon 130.

Further, as shown in FIG. 4, the elevator system 10 may include personal mobile terminals 200 carried by passengers 90, for example, personal mobile terminals 200-1 and 200-2 carried by two passengers respectively. Each personal mobile terminal 200 is configured to sense a wireless signal broadcast by a wireless beacon in the elevator system 10 when a distance condition is met, for example, sense the first wireless signal 123 broadcast by the first wireless beacon 120 and sense the second wireless signal 133 broadcast by the second wireless beacon 130. Moreover, in an embodiment, each authorized personal mobile terminal 200 is capable of automatically sending a corresponding elevator service request command to a wireless beacon in the elevator system 10 if a corresponding condition is met, for example, sending an elevator service request command representing an elevator call to the first wireless beacon 120, and sending an elevator service request command representing a destination floor to the second wireless beacon 130.

The personal mobile terminal 200 in the foregoing embodiment can conveniently acquire an elevator identifier as well as mapping data between the elevator identifier and a terminal identifier, and can generate and send authorization request information conveniently. Correspondingly, the authorization management apparatus 300 can conveniently learn the mapping data between the elevator identifier and the terminal identifier through the authorization request information, thereby easily knowing an access permission of which elevator should be granted to which passenger, so that access permission management for the elevator system can be realized easily, and the authorization operation also can be displayed easily. Particularly, in the elevator management system 20 in the foregoing example, it is unnecessary to perform authorization management for each passenger 90 face to face, and the whole authorization requesting process and the authorization management process are fast, convenient, and efficient.

Figure 5:
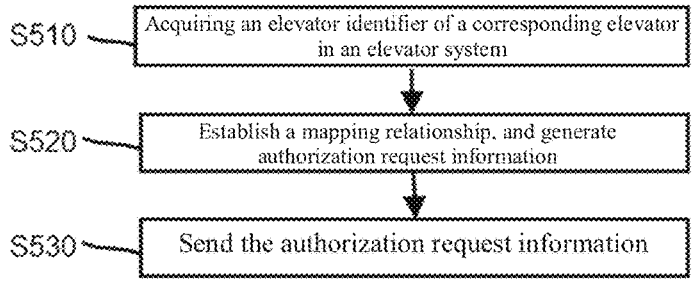
FIG. 5 is a flowchart of an authorization requesting method for an elevator service request according to an embodiment of the present invention.

FIG. 5 is a flowchart of an authorization requesting method for an elevator service request according to an embodiment of the present invention. The authorization requesting method shown in FIG. 5 is mainly completed in the personal mobile terminal 200 shown in FIG. 1. The authorization requesting method is illustrated through examples in the following with reference to FIG. 1 to FIG. 3 and FIG. 5.

In step S510, an elevator identifier of a corresponding elevator in an elevator system is acquired. For example, in the scenario shown in FIG. 2, if a passenger 90 wants to obtain a permission to access an elevator 101a, that is, be authorized to send an elevator service request command to the elevator 101a, the passenger 90 may scan a QR code 102a of the elevator 101a, that is, an elevator identifier 102a, through an acquiring unit 220 of a personal mobile terminal 200, thereby obtaining the elevator identifier of the elevator 101a, and may also obtain other related information of the elevator 101a.

In step S520, a mapping relationship is established, and authorization request information is generated. In this step, because the terminal identifier of the personal mobile terminal 200 is known to the personal mobile terminal 200 or is pre-stored, after the elevator identifier of the elevator 101a is acquired, a mapping relationship between the terminal identifier and the elevator identifier can be established to form mapping data. That is, the terminal identifier is mapped to the elevator identifier 102a, or the elevator identifier 102a is mapped to the terminal identifier. Further, authorization request information including the mapping relationship is generated. The authorization request information includes, for example, the elevator identifier 102a, the terminal identifier, and the mapping relationship therebetween. In another embodiment, the authorization request information may further include identity certificate information (for example, an ID card image required in an authorization verification process, or the like) of a passenger 90 and/or a floor requested to be authorized (for example, multiple pieces of input floor information as shown in FIG. 3).

In step S530, the authorization request information is sent. In this step, the authorization request information generated by the personal mobile terminal 200 can be remotely sent to the authorization management apparatus 300.

The steps S510 to S530 above illustrate a main process of one authorization request. By repeating the steps S510 to S530 above, multiple authorization requests can be completed, for example, authorization requests for different floors of the same elevator, authorization requests for different elevators, and even authorization requests for the same elevator in different time periods (for example, an authorization request is performed again after an authorization expires). It will be appreciated that the whole authorization requesting process is simple and convenient.

Figure 6:
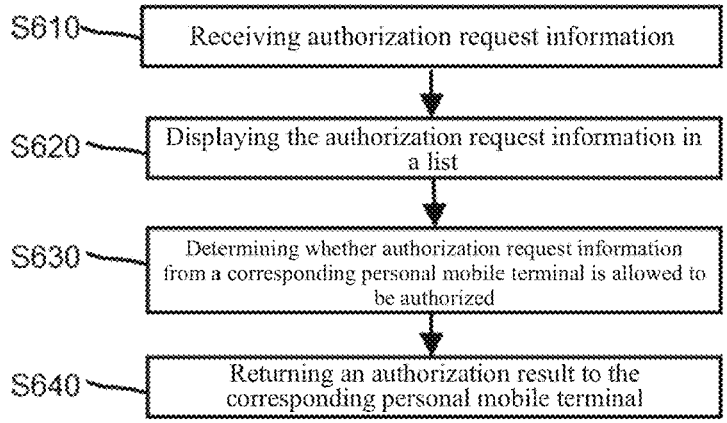
FIG. 6 is a flowchart of an authorization management method for an elevator service request according to an embodiment of the present invention.

FIG. 6 is a flowchart of an authorization management method for an elevator service request according to an embodiment of the present invention. The authorization management method shown in FIG. 6 is mainly completed in the authorization management apparatus 300 shown in FIG. 1. The authorization requesting method is illustrated in the following with reference to Table 1 and FIG. 6.

In step S610, authorization request information from one or more personal mobile terminals 200 is received.

In step S620, the authorization request information is displayed in a list. For example, multiple pieces of authorization request information are displayed in a list shown in Table 1, and a mapping relationship between elevator identifiers and terminal identifiers will also be presented in front of a manager intuitively. The manager can perform an authorization operation according to existing information.

In step S630, it is determined whether authorization request information from a corresponding personal mobile terminal is allowed to be authorized. In this step, based on an authorization mode (c) which is determined to be used, that is, allowed authorization or disallowed authorization fully based on manual input, a manual authorization operation is performed on each piece of authorization request information one by one. For example, by operating on the "authorization operation" column shown in Table 1, the manager can determine whether to allow authorization of authorization request information in a corresponding row. Clicking or activating "☑" represents allowing authorization of the authorization request information, and clicking or activating "☒" represents not authorizing the authorization request information. In the manual operation process, it is determined, at least according to the mapping relationship between the elevator identifier and the terminal identifier of the personal mobile terminal in the authorization request information, whether the authorization request information from the corresponding personal mobile terminal is allowed to be authorized. For example, as shown in the first row in Table 1, it can be determined, according to information about the terminal identifier 200 stored in the authorization management apparatus 300, whether to allow authorization of an elevator service request for the elevator identifier "10-A" corresponding to the terminal identifier 200. If authorization is allowed, "☑" is activated in the "authorization operation" column, and if the elevator service request is not authorized, "☒" is activated in the "authorization operation" column.

In step S640, an authorization result is returned to the corresponding personal mobile terminal 200.

So far, a method process of completing authorization management by manual input of a manager is basically finished.

Figure 7:
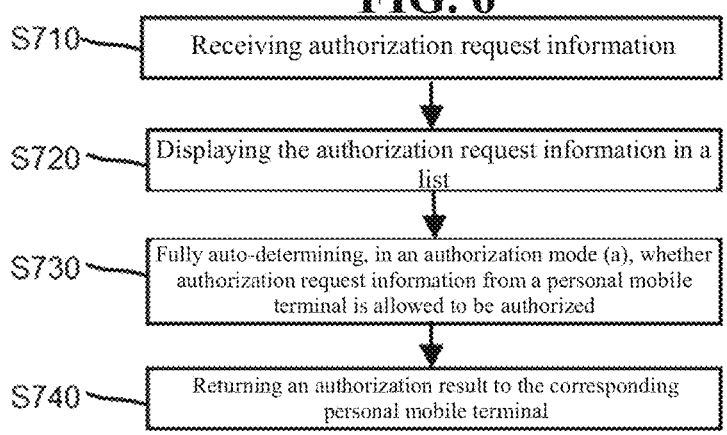
FIG. 7 is a flowchart of an authorization management method for an elevator service request according to another embodiment of the present invention.

FIG. 7 is a flowchart of an authorization management method for an elevator service request according to another embodiment of the present invention. The authorization management method shown in FIG. 7 is mainly completed in the authorization management apparatus 300 shown in FIG. 1. The authorization requesting method is illustrated in the following with reference to FIG. 1 and FIG. 7.

In step S710, authorization request information from one or more personal mobile terminals 200 is received.

In step S720, the authorization request information is displayed in a list. For example, multiple pieces of authorization request information are displayed in a list, and a mapping relationship between elevator identifiers and terminal identifiers will also be presented in front of a manager intuitively. In another embodiment, the authorization request information may not be displayed according to a specific situation.

In step S730, it is fully auto-determined, in an authorization mode (a), whether the authorization request information from the personal mobile terminal is allowed to be authorized. In this step, authorization verification is performed on all the authorization request information automatically based on the already selected authorization mode (a), that is, fully auto-allowed authorization or fully auto-disallowed authorization. For example, all the authorization request information is automatically allowed to be authorized, or all the authorization request information is automatically disallowed to be authorized.

In step S740, an authorization result is returned to the corresponding personal mobile terminal 200.

So far, a method process of completing fully auto-authorization management without depending on a manager is basically finished.

Figure 8:
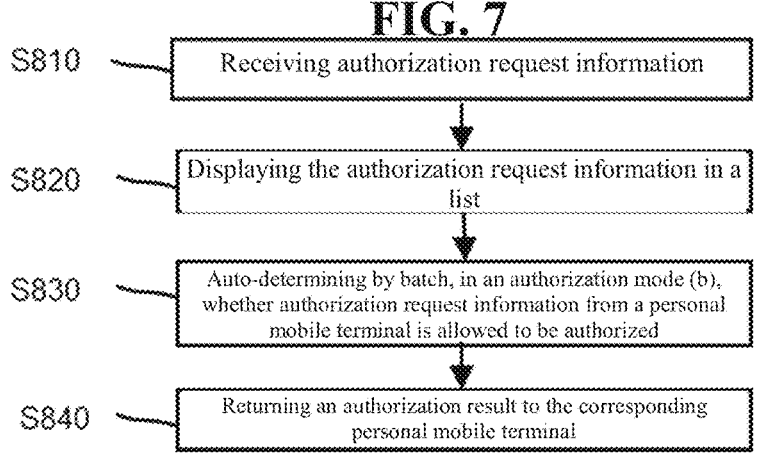
FIG. 8 is a flowchart of an authorization management method for an elevator service request according to still another embodiment of the present invention.

FIG. 8 is a flowchart of an authorization management method for an elevator service request according to still another embodiment of the present invention. The authorization management method shown in FIG. 8 is mainly completed in the authorization management apparatus 300 shown in FIG. 1. The authorization requesting method is illustrated in the following with reference to Table. 1 and FIG. 8.

In step S810, authorization request information from one or more personal mobile terminals 200 is received.

In step S820, the authorization request information is displayed in a list. For example, multiple pieces of authorization request information are displayed in a list, and a mapping relationship between elevator identifiers and terminal identifiers will also be presented in front of a manager intuitively. In another embodiment, the authorization request information may not be displayed according to a specific situation.

In step S830, it is fully auto-determined, in an authorization mode (b), whether the authorization request information from the personal mobile terminal is allowed to be authorized. In this step, authorization verification is performed on authorization request information in each batch automatically based on the selected authorization mode (b), that is, auto-allowed authorization or auto-disallowed authorization by batch. For example, all the authorization request information is automatically allowed to be authorized, or all the authorization request information is automatically disallowed to be authorized.

In an embodiment, a first terminal identifier list of personal mobile terminals 200 for auto-allowing authorization by batch and/or a second terminal identifier list of personal mobile terminals 200 for auto-disallowing authorization by batch may further be acquired. For example, the first terminal identifier list of personal mobile terminals 200 for auto-allowing authorization by batch which is pre-stored in the authorization management apparatus 300 may be acquired from the authorization management apparatus 300 through browsing. Specifically, the first terminal identifier list includes, for example, terminal identifiers (such as communication numbers) of personal mobile terminals 200 that do not have an access permission limitation with respect to an elevator or all elevators. As such, in the authorization management unit 320, all authorization request information corresponding to the terminal identifiers in the first terminal identifier list is allowed to be authorized by batch. A similar exemplary operation can be performed for the second terminal identifier list.

In step S840, an authorization result is returned to the corresponding personal mobile terminal 200.

So far, a method process of completing auto-authorization management by batch is basically finished.

It should be noted that at least two of the foregoing method processes shown in FIG. 6 to FIG. 8 can be performed in the same authorization management apparatus 300. For example, the authorization management apparatus 300 manages authorization request information corresponding to an elevator A, an elevator B, and an elevator C. For the elevator A, the authorization mode (c) is selected, and authorization management for authorization request information is completed based on the authorization management method shown in FIG. 8. For the elevator B, the authorization mode (a) is selected, and authorization management for authorization request information is completed based on the authorization management method shown in FIG. 7. For the elevator C, the authorization mode (b) is selected, and authorization management for authorization request information is completed based on the authorization management method shown in FIG. 8.

It will be appreciated that the authorization management method for an elevator service request in the foregoing example can be carried out for one piece of authorization request information or one batch of authorization request information. The whole authorization management process is simple and efficient, and is convenient for a manager to perform an authorization management operation. Especially, for the manager, the authorization management processes in the methods in FIG. 7 and FIG. 8 are simpler and more efficient.

It should be noted that the personal mobile terminal 200 in the foregoing embodiment of the present invention can be implemented by computer program instructions, for example, implemented through a special APP. These computer program instructions can be provided to a processor of a general-purpose computer, a special-purpose computer, or another programmable data processing device to form the personal mobile terminal 200 in the embodiment of the present invention. Moreover, the processor of the computer or another programmable data processing device executes these instructions to create units or components for implementing these flowcharts and/or blocks and/or functions/operations specified in on or more flowchart blocks.

It should be noted that the authorization management apparatus 300 in the foregoing embodiment of the present invention can be implemented by computer program instructions, for example, implemented through a special computer program. These computer program instructions can be provided to a processor of a general-purpose computer, a special-purpose computer, or another programmable data processing device to form the authorization management apparatus 300 in the embodiment of the present invention.

Moreover, the processor of the computer or another programmable data processing device executes these instructions to create units or components for implementing these flowcharts and/or blocks and/or functions/operations specified in on or more flowchart blocks.

Moreover, these computer program instructions can be stored in a computer readable memory. These instructions can instruct a computer or another programmable processor to implement functions in a specific manner, such that these instructions stored in the computer readable memory construct a manufactured product including instruction components that implement functions/operations specified in one or more blocks of the flowcharts and/or block diagrams.

It should be further noted that in some alternative implementations, the functions/operations shown in the blocks may not occur according to the order shown in the flowchart. For example, two blocks shown sequentially may actually be executed basically at the same time or these blocks can be executed in a reversed order sometimes, which specifically depends on the involved functions/operations.

It should be noted that elements (including flowcharts and block diagrams in the accompanying drawings) disclosed and depicted in the specification mean logic boundaries between the elements. However, according to software or hardware engineering practice, the depicted elements and functions thereof can be executed on a machine via a computer executable medium. The computer executable medium has a processor capable of executing a program instruction stored on the computer executable medium. The program instruction is used as a single-chip software structure, an independent software module, or a module using an external program, code, service and the like, or a combination thereof, and all the execution solutions can fall within the scope of this disclosure.

Although different non-limitative implementation solutions have specifically illustrated components, implementation solutions of the present invention are not limited to these specific combinations. It is possible to use a combination of some of components or features in any non-limiting implementation solution with features or components from any other non-limiting implementation solution.

Although a specific step sequence is shown, disclosed and claimed, it should be understood that steps can be implemented in any order, separated or combined, and will still benefit from this disclosure unless otherwise specified.

The above description is exemplary, and is not defined to limit the present invention. Various non-limitative implementation solutions are disclosed. However, those of ordinary skill in the art can realize that various modifications and changes will fall within the scope of the appended claims according to the foregoing teachings. Therefore, it will be appreciated that disclosure content apart from the specific disclosure can be carried out within the scope of the appended claims. Due to this reason, the appended claims should be read up to determine the true scope and content.

What is claimed is:

1. An authorization management apparatus for an elevator service request, comprising:
 a receiving unit configured to receive authorization request information from a personal mobile terminal, wherein the authorization request information comprises an elevator identifier of a corresponding elevator of an elevator system acquired by a camera of the personal mobile terminal and a terminal identifier of the personal mobile terminal mapped to the elevator identifier; and an authorization management unit configured to determine, at least according to a mapping relationship between the elevator identifier and the terminal identifier in the authorization request information, whether the authorization request information from the personal mobile terminal is allowed to be authorized.

2. The authorization management apparatus of claim 1, wherein the authorization management apparatus is provided in a property management system of a building where the elevator system is located.

3. The authorization management apparatus of claim 1, wherein the authorization management unit is further configured to display multiple pieces of the authorization request information in a list.

4. The authorization management apparatus of claim 1, wherein the authorization management unit is further configured to, if the authorization request information of the personal mobile terminal corresponding to an elevator in an elevator group is allowed to be authorized, allow authorizing the personal mobile terminal to send an elevator service request command to another elevator in the elevator group.

5. The authorization management apparatus of claim 1, wherein the authorization management unit is further configured to determine, in at least one of the following three authorization modes, whether the authorization request information from the personal mobile terminal is allowed to be authorized:
(a) fully auto-allowed authorization or fully auto-disallowed authorization in which authorization is determined to be allowed or forbidden,
(b) auto-allowed authorization or auto-disallowed authorization by batch, and
(c) allowed authorization or disallowed authorization fully based on manual input.

6. The authorization management apparatus of claim 5, wherein the authorization management unit is further configured to use corresponding authorization modes in the authorization modes (a) to (c) for different elevators, different elevator systems, or different elevator groups.

7. The authorization management apparatus of claim 5, wherein the authorization management unit is further configured to, when the authorization mode (b) is used, acquire a first list of terminal identifiers of personal mobile terminals for allowing authorization automatically in batches and a second list of terminal identifiers of personal mobile terminals for forbidding authorization automatically in batches.

8. An authorization management method for an elevator service request, comprising:
receiving authorization request information from one or more personal mobile terminals, wherein the authorization request information comprises an elevator identifier of a corresponding elevator of an elevator system acquired by a camera of a corresponding personal mobile terminal and a terminal identifier of the personal mobile terminal mapped to the elevator identifier; and
determining, at least according to a mapping relationship between the elevator identifier and the terminal identifier in the authorization request information, whether the authorization request information from the corresponding personal mobile terminal is allowed to be authorized.

9. The authorization management method of claim 8, further comprising:
displaying multiple pieces of the authorization request information in a list.

10. The authorization management method of claim 8, further comprising:
if the authorization request information of the personal mobile terminal corresponding to an elevator in an elevator group is allowed to be authorized, allowing authorization of the personal mobile terminal to send an elevator service request command to another elevator in the elevator group.

11. The authorization management method of claim 8, wherein in the determining, at least one of the following three authorization modes is used to determine whether the authorization request information from the personal mobile terminal is allowed to be authorized:
(a) fully auto-allowed authorization or fully auto-disallowed authorization in which authorization is determined to be allowed or forbidden,
(b) auto-allowed authorization or auto-disallowed authorization by batch, and
(c) allowed authorization or disallowed authorization fully based on manual input.

12. The authorization management method of claim 11, wherein in the determining, corresponding authorization modes in the authorization modes (a) to (c) are used for different elevators, different elevator systems, or different elevator groups.

13. The authorization management method of claim 11, wherein in the determining, when the authorization mode (b) is used, a first list of terminal identifiers of personal mobile terminals for allowing authorization automatically in batches and a second list of terminal identifiers of personal mobile terminals for forbidding authorization automatically in batches is acquired.

14. A computer apparatus, comprising a memory, a processor, and a computer program stored in the memory and operable in the processor, wherein when the program is executed by the processor, the authorization management method of claim 8 is implemented.

15. A non-transitory computer readable storage medium, having stored thereon a computer program, wherein the program is executed by a processor to implement the authorization management method of claim 8.

16. An elevator management system for managing a personal mobile terminal configured to send an elevator service request command automatically, wherein the elevator management system comprises:
the authorization management apparatus of claim 1.

17. An authorization requesting method for an elevator service request, comprising:
acquiring, using a camera of a personal mobile terminal, an elevator identifier of a corresponding elevator of an elevator system; and
generating authorization request information and sending the authorization request information, wherein the authorization request information comprises the acquired elevator identifier and a terminal identifier of a personal mobile terminal mapped to the elevator identifier.

18. The authorization requesting method of claim 17, wherein the authorization request information further comprises identity certificate information of a passenger and/or a floor requested to be authorized.

19. The authorization requesting method of claim 17, further comprising inputting the floor requested to be authorized.

20. The authorization requesting method of claim 17, wherein the elevator identifier is a QR code or a barcode.

21. The authorization requesting method of claim 20, wherein the elevator identifier is acquired by scanning the QR code or the barcode.

22. The authorization requesting method of claim 17, wherein the terminal identifier is a communication number, a unique identification code of the personal mobile terminal, or an ID of a passenger using the personal mobile terminal.

23. The authorization requesting method of claim 17, wherein sending the authorization request information includes sending the authorization request information to an authorization management apparatus for an elevator service request corresponding to the elevator system.

24. The authorization requesting method of claim 17, further comprising:
- establishing a mapping relationship between the acquired elevator identifier and the terminal identifier of the personal mobile terminal such that the terminal identifier is mapped to the elevator identifier or the elevator identifier is mapped to the terminal identifier.

25. An authorization requesting system for an elevator service request, comprising a memory, a processor, and a computer program stored in the memory and operable in the processor, wherein when the program is executed by the processor, the authorization requesting method of claim 17 is implemented.

26. A non-transitory computer readable storage medium, having stored thereon a computer program, wherein the program is executed by a processor to implement the authorization requesting method of claim 17.

\* \* \* \* \*